Figure 1:
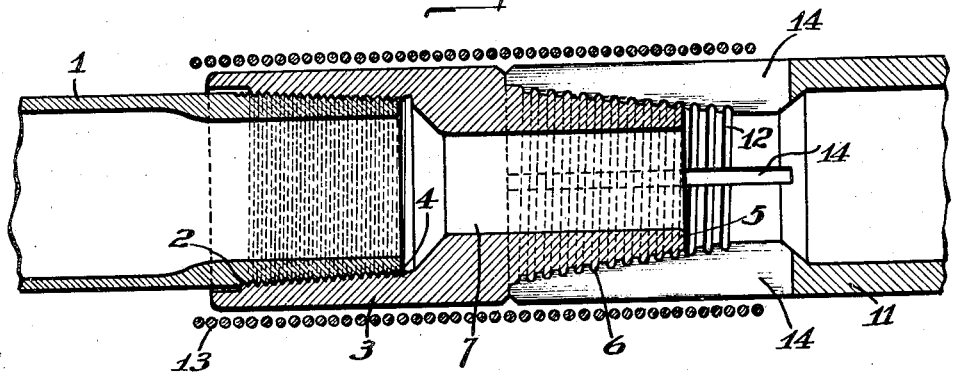

Aug. 4, 1931.  G. M. EATON  1,817,808

METHOD OF MAKING TIGHT THREADED JOINTS

Filed Nov. 20, 1930

WITNESSES
A B Wallace
W. D. O'Connor

INVENTOR
George M. Eaton
by Brown & Critchlow
his attorneys

Patented Aug. 4, 1931

1,817,808

UNITED STATES PATENT OFFICE

GEORGE M. EATON, OF PITTSBURGH, PENNSYLVANIA, ASSIGNOR TO SPANG CHALFANT & COMPANY, INC., OF PITTSBURGH, PENNSYLVANIA, A CORPORATION OF PENNSYLVANIA

METHOD OF MAKING TIGHT THREADED JOINTS

Application filed November 20, 1930. Serial No. 496,949.

This invention relates generally to screw threaded joints, and particularly to threaded joints for pipe such as the drill pipe used in drilling wells.

In drilling wells by the rotary process the drill is turned by means of a drill pipe that is made up of sections of heavy tubing connected together by what are known as tool joints. The tool joints are provided with relatively coarse threads to permit the drill pipe to be readily assembled or taken apart during the procedure of drilling a well. Each joint comprises two cooperating members that ordinarily are secured to the ends of adjacent pipe sections by means of the usual tapered pipe threads.

In an effort to make a tight connection between the pipe sections and the joint members, they are ordinarily provided with complementary threads made as accurately as is commercially practicable. The threads are lubricated by a compound developed for this particular purpose and are screwed together by power driven machinery. In turning the joint and pipe together by means of power, it frequently happens that the frictional forces acting upon the screw threads cause excessive local heating, in spite of the lubricant, which results in what is known as galling. That is to say, the heated metal of one member sticks to the other member and becomes rolled or wedged between the threads in such manner as to leave an opening between the joint and the tube.

In the rotary drilling process water or mud is forced into the well through the hollow drill pipe for the purpose of washing out and carrying away the drill cuttings. Near the bottom of deep wells in particular, the mud within the drill pipe is under very high hydraulic pressure and has a tendency to leak out through any available opening. In the event that the threads on the drill pipe are galled when the joint members are turned together, sufficient space may be left to permit the mud to leak out under the high pressure to which it is subjected. As a result of the high pressure, the mud passes through the leak at high velocity and because of its abrasive action quickly cuts away the metal. As the metal is cut away the leakage flow increases and the process is cumulative until the joint is so weakened that it fails. In the event that the joint should fail while the drill pipe is being withdrawn from the well, the portion of the pipe below the joint which fails will be permitted to drop to the bottom of the well and may telescope in such manner that it cannot be recovered, and as a consequence the well will necessarily have to be abandoned.

The object of the invention is to provide a method of making a threaded joint between two members, which method will avoid galling the threads between the members and will result in a tight leak-proof joint.

Figure 2:
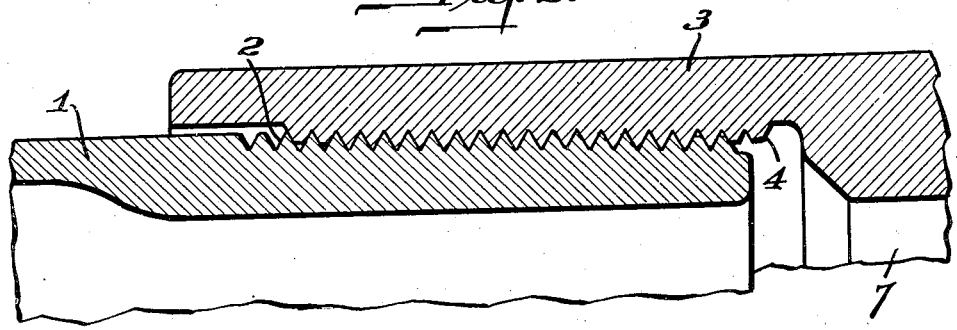
Figure 3:
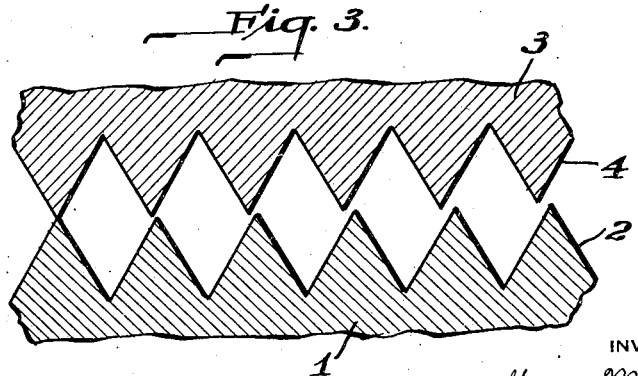

The foregoing and other objects, which will be apparent upon reading the following portions of the specification, may be achieved by means of the particular embodiment of the invention described therein and shown in the accompanying drawings in which; Fig. 1 is a view in longitudinal section of a drill pipe embodying my invention and illustrating a portion of the machine used in assembling it; Fig. 2 is a similar view of a fragment of the drill tube and tool joint enlarged to show in detail the cooperating threads in full engagement; and Fig. 3 is an enlarged diagrammatic view in longitudinal section of the mating threads with the tips of the threads placed in juxtaposition to illustrate the difference in pitch therebetween when the threads are at the same temperature.

In accordance with the present invention a threaded joint is provided in which the threads on the cooperating members are so cut that when the members are at temperatures differing sufficiently to enable a shrink fit to be effected between them, the threads will be complementary. To accomplish this the threads on the members are cut with predetermined differences in their pitches when they are at room temperature. The member having the internal threads is then heated to expand it an amount sufficient to make its thread complementary to the external thread. The two are then screwed together with just sufficient force to insure full engagement of the threads, but without exerting force enough to damage them by galling. When the member having the internal threads is cooled to room temperature, the threads shrink into firm engagement with the external threads without causing any deformation that might result in leakage between them.

The particular application of the invention which is shown in the drawings is a drill pipe for boring wells by the rotary process. Such drill pipes usually comprise a tubular member and a tool joint secured to the end of the tubular member by means of standard tapered pipe threads. The present invention is particularly applicable to the threaded connection between the drill tube and the tool joint inasmuch as the conditions under which drill pipes operate are very severe, and it is difficult to form a tight connection between the tube and the tool joint.

Attempts have been made to form the tool joint integral with the drill pipe, but this type of construction is not satisfactory for the reason that it can be properly heat treated only with great difficulty. In order to withstand the stresses to which they are subjected, both the drill tube and the tool joint should be heat treated to develop the full strength of the metal. To permit proper heat treatment, articles should be of substantially uniform cross section, and for this reason the drill tubes and tool joints are usually heat treated separately and then joined by means of a threaded connection.

As shown in Fig. 1, the drill pipe comprises a seamless tube 1 that is provided at its ends with external tapered screw threads 2 such as are ordinarily utilized in making pipe connections. Disposed on the end of the tube 1 is a tool joint member 3 having internal tapered threads 4 that cooperate with the external threads 2 on the tube. At its other end, the joint member 3 is provided with a tapered connecting boss 5 having relatively coarse external threads 6 for engaging a mating tool joint member (not shown) on the end of another section of drill pipe and which is provided with internal tapered threads complementary to the threads 6 on the joint member 3. It may be readily seen that the threads 6 are so formed that the joint member 3 may be easily connected to or unscrewed from a complementary joint member in the process of running a string of drill pipe into a well or withdrawing it therefrom. A cylindrical passageway 7 is provided longitudinally of the joint to permit circulating liquid to be pumped through the drill pipe.

Ordinarily the joint members 3 are turned on the ends of the tubular members 1 with considerable force and with the members at room temperature. By this process the tapered threads 2 and 4 are frequently galled, for the reason that if any slight irregularity occurs in the thread of either member, excessive friction may be developed at that point and local heating occur, particularly when considerable power is utilized to turn the threads together. Local heating then results in the metal being softened and displaced, and the threads may be damaged by galling to such an extent that leakage will occur through them when the joint is subjected to high pressure.

By the present invention I fit the tool joint 3 to the drill tube 1 with the tool joint heated to a degree which expands it to such extent that it may be turned to its final position by the application of a comparatively small force and without danger of injuring the threads, and then permitted to shrink into firm engagement with the drill pipe as it cools.

However, upon giving the matter some little consideration it will be readily apparent that if standard tapered pipe threads are utilized, no advantage will be gained by heating the member having the internal threads. If a tool joint having standard internal threads is heated and applied to standard threads on a drill pipe, it is apparent that the threads near the center of the threaded portions will be expanded radially as a result of the heating and will, theoretically, be capable of being turned on the threads of the pipe a greater distance than would be possible if the joint were not heated. However, inasmuch as the joint expands longitudinally as well as radially, the end threads will be displaced longitudinally relative to the cooperating end threads on the pipe and the pitches of the threads will no longer be equal. As a matter of fact, the proportions of a standard joint are such that when expanded by heat the faces of the end threads move substantially parallel to the faces of the cooperating threads on the pipe and consequently the joint member can not be turned on the pipe any farther after being heated than it could be when cold with the application of the same amount of force. Further, if a standard joint were heated and applied to a standard pipe the probability of galling the threads would actually be greatly increased inasmuch as the threads at the center of the joint would be expanded radially out of contact with the threads on the pipe and the threads at the ends would be subjected to the entire load.

To make it possible to gain a decided advantage by assembling the tool joint on the pipe with the tool joint expanded, I provide a special thread on one or both of the cooperating members, as shown diagrammatically in Fig. 3. This thread is so cut that when the member 3 to be expanded is heated to a predetermined temperature the threads 2 and 4 will be of equal pitch and complementary to one another. The predetermined temperature difference is so selected that when the members 1 and 3 ar screwed together at this temperature difference with the application of only a small amount of power, the external member will shrink and firmly grip the internal member upon cooling. It is desirable that this temperature difference be so selected that a shrink fit or gripping action will occur which stresses the material to a considerable degree to ensure a tight joint. However, the temperature should not exceed the temperature to which the joint was drawn after quenching during the heat treating process.

Ordinarily I prefer to cut special threads on the drill pipe 1 of pitch greater than the pitch of the standard internal threads 4 of the tool joint 3. However, this is merely a commercial expedient which has been adopted for the reason that the threads in the tool joint are standard with the trade.

It may be said that by utilizing my special thread on the drill pipe 1 and heating the tool joint 3 the joint may be turned on with very little power to the position which it would occupy if standard threads were utilized, and the assembling operation performed with the parts cold and with the usual amount of power. As a concrete example, we may consider a standard drill pipe having an outside diameter of 6⅝ inches with eight threads per inch and a taper of three-fourths of an inch in diameter per foot of length. This taper may be expressed as a taper of .0078 inch in diameter per thread. With the coefficient of expansion for steel taken as .000006 per degree Fahrenheit, it may be readily calculated that it will require an increase of temperature of 200° F. to increase the diameter of the tool joint .0078 inch or a sufficient amount to permit the joint to be turned on the pipe one thread farther, assuming that the threads are complementary, than would be possible if the joint were cold.

Hence, if it is customary to turn the tool joint 3 on the pipe 1 by means of power for a distance of say four threads after the threads have been brought into engagement by hand or by the application of a small amount of power, the joint 3 can be brought to the same position without force if the pipe is provided with threads in accordance with this invention, and the joint is heated to a temperature substantially 800° higher than that of the pipe. In such case the threads on the pipe are cut at a pitch which makes them complementary to the threads in the joint when the joint is at a temperature 800° higher than the temperature of the pipe. With the joint member at this predetermined temperature, it is quickly turned on the threads of the pipe 1 until it seats, with the application of a moderate amount of force. Care is taken that the force exerted upon it is not great enough to in any way deform or damage the cooperating screw threads.

As the temperature of the two members equalize, the threads 4 on the joint member 3 will shrink to substantially the position which they would have occupied if the joint member 3 had been applied cold and with full power to a pipe 1 having standard threads. However, the final movement of the threads into engagement takes place along radii of a sphere centered at the midlength of the axis of the threads and with comparatively little relative motion between the cooperating threads, as compared with the final seating of cold standard threads which takes place circumferentially and with a large amount of relative motion between the members which are in contact under heavy pressure. It is obvious that in accordance with my invention the threads move to their final position without galling each other or otherwise detrimentally effecting the union.

A certain amount of plastic flow will take place as the joint tightens upon being cooled, particularly at the end threads, and at any points where the threads are slightly irregular as the result of being damaged in handling. Such plastic flow is in no way injurious to the joint and may result in making a tighter joint by closing any small openings which may occur between the threads. At any event it is clear that such plastic flow cannot result in galling the threads inasmuch as the relative motion between the threads at the time plastic flow takes place is very slight. In the event that the end threads of the joint tend to ride up or slip along the faces of the threads on the pipe when cooling, it may be necessary to utilize threads having steeper faces than the faces of the usual 60° V threads. In such case threads of the Acme or similar type may be used to advantage.

I prefer to assemble the tool joint 3 on the pipe 1 without the use of lubricant inasmuch as it is not necessary for the reason that large frictional forces are not encountered and for the reason that a better joint may be had between the dry metal surfaces. If additional gripping force is desirable, one of the surfaces, preferably the harder one, may be roughened slightly as by sand blasting, to enable it to cut into the other member during the shrinking process, or a fine abrasive material may be introduced between the threads to accomplish the same general result.

The lubricant which is ordinarily used on the screw threads when assembling tool joints on drill pipes serves also to fill the spaces which occur between the tips and the roots of the engaging threads, and to thus seal the joint against leakage. This sealing effect may be obtained in joints embodying my invention by applying to the threads any suitable substance, preferably of non-lubricating character, such for instance as a thick varnish that will flow into the spaces between the threads and subsequently harden, Drill pipes made according to my invention may be readily assembled on a machine such as a standard lathe having the usual standard thread cutting lead screw. In Fig. 1 there is shown a socket or fixture 11 that may be mounted on the head stock of a lathe (not shown) for receiving and rotating the tool joint 3. As shown, the socket 11 is provided with internal threads 12 that are complementary to the external threads 6 on the joint 3, or in the event that the joint 3 is provided with internal threads, a suitable fixture having complementary external threads may be utilized. The fixture 11 is encircled by an induction coil 13 that is mounted to be moved longitudinally over the socket 11 and is connected to a suitable source (not shown), of alternating electric current of proper frequency in a well known manner.

In the process of assembling the joint member 3 on the drill tube 1, the joint 3 is first screwed into the fixture 11, after which the induction coil 13 is moved to a position in which it encircles the joint 3 and the alternating current is applied to heat the joint by induction to the predetermined temperature for assembly. The drill tube 1 having external threads 2, which are cut to be complementary to the internal threads 4 of the joint 3 when it is heated to the predetermined temperature, is mounted on the longitudinal carriage of the machine in alignment with the joint 3. The lead screw and head stock gearing of the machine are so adjusted as to feed the pipe 1 into the end of the joint 3 at the proper speed relative to the rotation of the joint 3 to ensure accurate engagement of the complementary threads. To ensure accurate entry of the threads on the pipe into the threads on the joint, the pipe 1 may be properly positioned on the lathe carriage by means of a double comb gage or by any other suitable means well known in the thread cutting art.

If desirable, the pitch of the threads in the joint 3 may be measured by means of a gage during the heating process (but with the electric current cut off temporarily) to ascertain when the threads have been expanded the required amount, or the gage may be dispensed with and the condition of the joint determined by measuring its temperature. When the proper degree of expansion has been reached, the current is cut off and the machine is started to feed the tube 1 into the rotating joint 3 at a rapid rate. It is desirable that there be considerable back lash in the lead screw mechanism to permit the tube to be drawn into the joint 3 without the assistance of or interference by the lead screw after the threads 2 and 4 have become engaged. Only sufficient power is applied to the fixture 11 to turn the joint 3 into full engagement with the threads on the tube 1. The machine may be so arranged that the head stock will stall before sufficient force may be applied to the joint 3 to damage the threads.

After the tool joint 3 has been permitted to cool and shrink into engagement with the tube 1, the lead screw connection is changed to adapt it to the coarse threads 6 and 12 of the connection between the tool joint 3 and the fixture 11. The head stock and the fixture 11 may then be rotated in the opposite direction to unscrew the assembled drill pipe from the socket threads 12. To prevent the tool joint 3 from sticking in the socket 11, it may be cooled by any suitable internal cooling device (not shown). It may also be desirable to provide some flexibility, as by cutting slots 14 longitudinally of the socket, which permit it to deflect when the joint member 3 is heated and subsequently cooled.

Drill pipes of standard size which have been assembled on a machine of this description, and in accordance with my method, have been subjected to severe tests and found to be entirely satisfactory. An attempt was made to unscrew the tool joint from the drill tube in a powerful testing machine with the result that the tube was twisted off without loosening the joint between the tube end and the tool joint.

From the foregoing description and explanation of my invention, it is apparent that I have provided a method of making drill pipe and other threaded connections which overcomes the objectionable features of such connections as heretofore made.

Although I have described only one practical embodiment of my invention, it will be obvious to others skilled in the mechanical art to which this apparatus relates that various modifications may be made in the type of threads utilized and in the mechanism for assembling one threaded member on the other without departing from the spirit and scope of my invention, as defined in the appended claims.

I claim:

1. The method of making a drill pipe for oil wells comprising the steps of cutting external screw threads on the end of a piece of pipe, cutting internal threads in the end of a tool joint of pitch somewhat less than the pitch of the threads on the pipe, heating the tool joint to expand the threads therein to substantially the pitch of the threads on the pipe, screwing the tool joint on the pipe with low torque to avoid damaging the threads, and cooling the tool joint to shrink it into firm engagement with the pipe.

2. The method of forming a tight threaded joint between tubular members that comprises cutting tapered threads on the members which threads are complementary when the difference between the temperature of the members is sufficient to ensure a shrink fit when the members are engaged and cooled to the same temperature, heating one of the members, screwing the members together without using sufficient force to injure the threads, and cooling the heated member to effect a tight shrink fit therebetween.

3. The method of making a tight threaded joint comprising the steps of cutting threads on two cooperating members which threads are complementary when the members are at a temperature difference sufficient to effect a shrink fit therebetween, heating one of the members to establish the predetermined temperature difference, screwing the members together, and cooling the heated member to shrink it on the other member.

4. The method of making a tight threaded joint between two members, comprising forming on the members threads of different pitches, heating the member having the smaller pitch thread to thermally expand it until its thread becomes complementary with that of the other member, screwing the expanded and the other member together, and cooling the expanded member.

5. The method of making a tight threaded joint between two members, comprising forming on the members internal and external threads respectively of different pitches, heating the member having the internal thread to thermally expand it until its thread becomes complementary with the external thread of the other member, screwing the expanded member on the other member and cooling the expanded member to cause the internal thread to grip the external thread.

6. The method of making a tight threaded joint between two tubular members comprising forming on one member external tapered screw threads, forming on the other member internal tapered screw threads of shorter pitch than the external threads, heating the member having the internal threads to thermally expand it until its threads become complementary with the external threads of the other member, screwing the expanded member on the other member to the position in which the cooperating tapered threads are in full engagement and cooling the expanded member to shrink the internal threads into tight engagement with the external threads.

In testimony whereof, I sign my name.

GEORGE M. EATON.